UNITED STATES PATENT OFFICE.

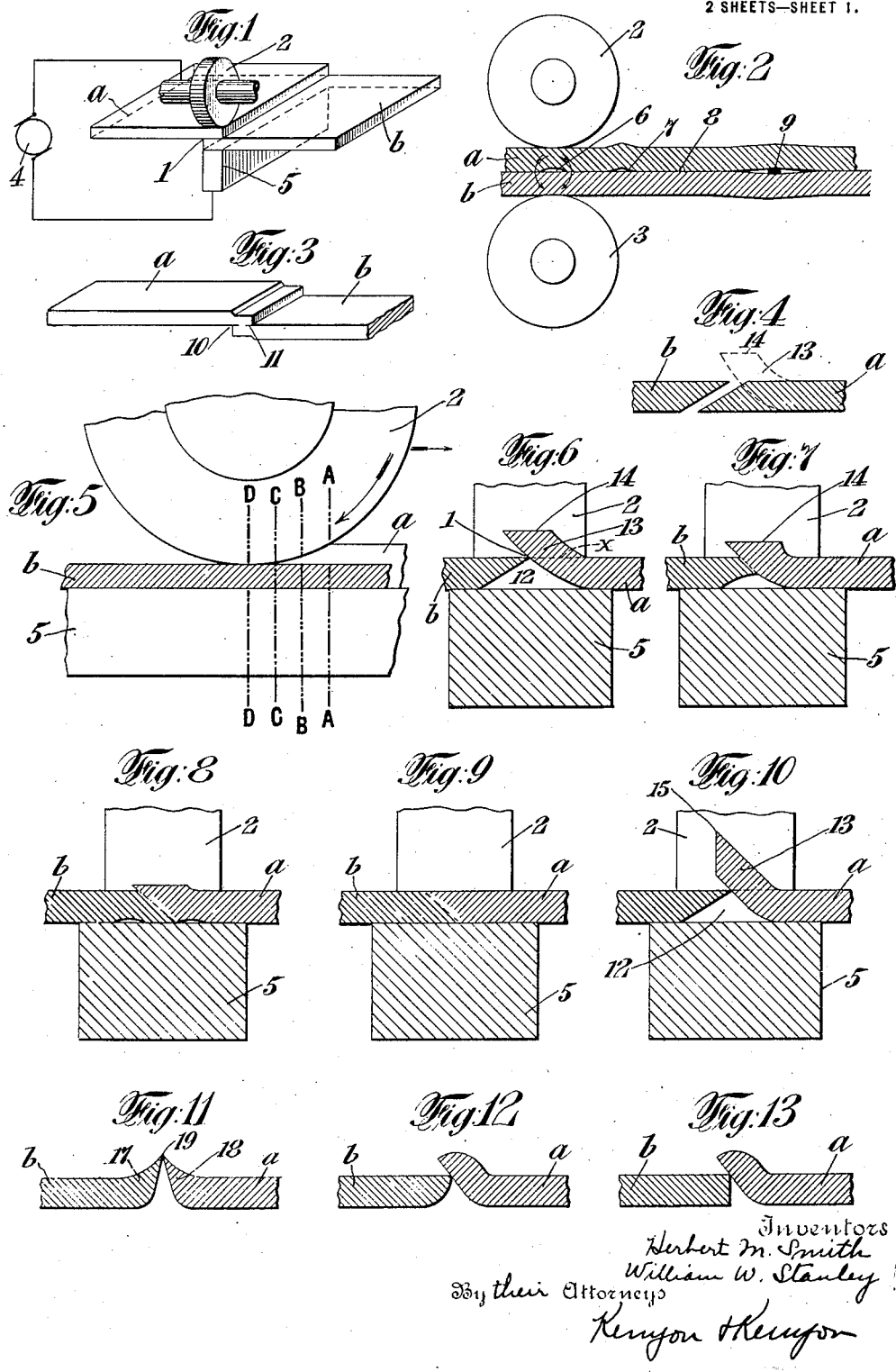

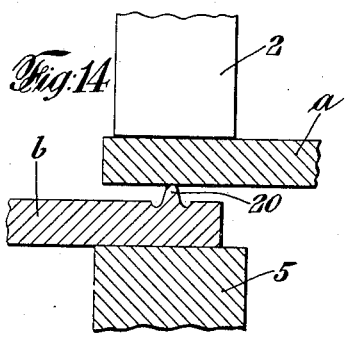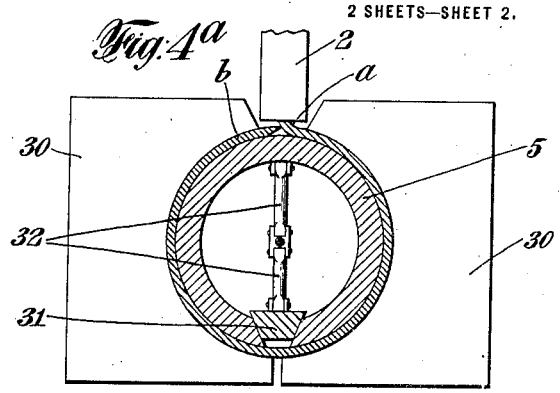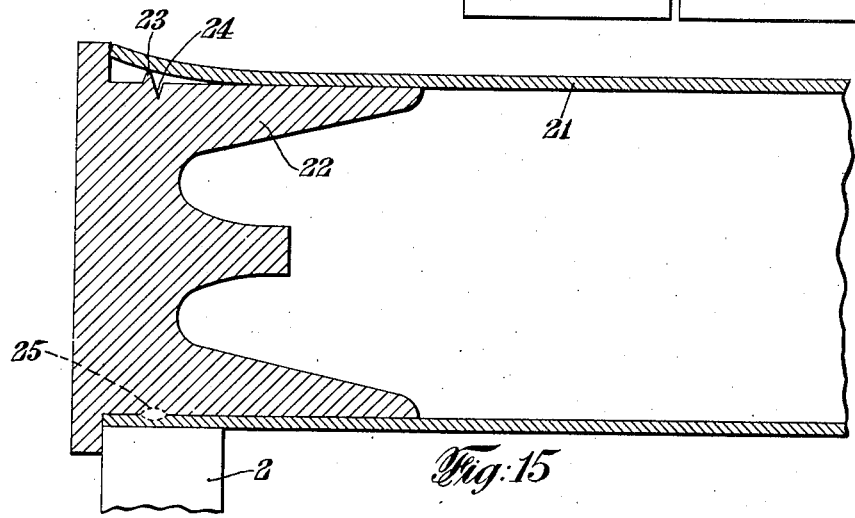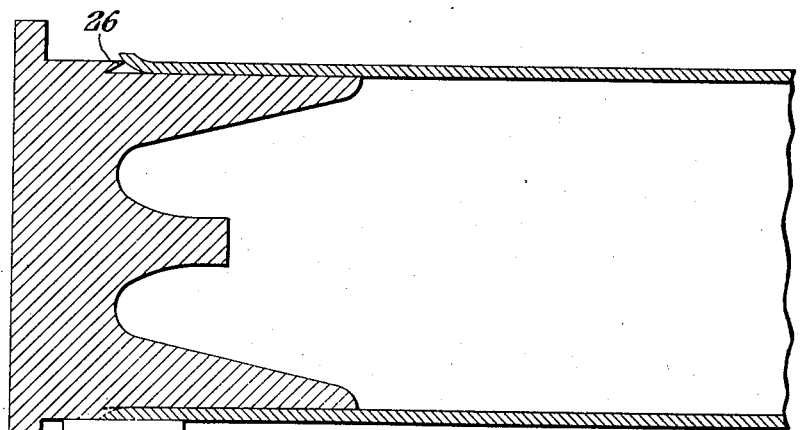

HERBERT M. SMITH AND WILLIAM W. STANLEY, OF GREAT BARRINGTON, MASSACHUSETTS, ASSIGNORS, BY MESNE ASSIGNMENTS, TO WILLIAM HALL WALKER, OF NEW YORK, N. Y.

ELECTRIC WELDING.

1,249,532.  Specification of Letters Patent.  Patented Dec. 11, 1917.

Application filed April 14, 1916. Serial No. 91,000.

*To all whom it may concern:*

Be it known that we, HERBERT M. SMITH and WILLIAM W. STANLEY, both citizens of the United States, and both residents of Great Barrington, county of Berkshire, State of Massachusetts, have invented certain new and useful Improvements in Electric Welding, of which the following is a specification.

The invention relates to improvements in electric welding. The main object of the invention is to provide an improved method of welding together metallic sheet edges or parts, so as to obtain a better and more uniform weld. In some cases it is important that the welded joint be perfectly tight and also be of practically the same thickness as the sheets or adjacent parts, as in the case of vacuum receptacles and other articles. The improvements in the preferred form thereof, among other things, are designed to accomplish these ends.

Further features, objects and advantages thereof will more clearly appear from the detailed description given below, taken in connection with the accompanying drawings, which form a part of this specification.

In the drawings Figure 1 is a diagram in perspective illustrating a common method of electric welding.

Fig. 2 is a section illustrating defects in such method.

Fig. 3 is a perspective view illustrating certain other defects therein.

Fig. 4 illustrates one method of forming the parts to be welded in accordance with the invention herein described.

Fig. 4ª is a section illustrating a method of clamping the parts in position during the welding process.

Fig. 5 is a view, partly in section, illustrating the forging action during the welding.

Figs. 6, 7, 8 and 9 are sections taken on the lines A—A, B—B, C—C, and D—D of Fig. 5.

Fig. 10 illustrates a modification in the way of forming sheet edges.

Figs. 11, 12, 13, 14, 15 and 16 illustrate other modifications.

It has been common in welding together sheet metal edges, by what is called "seam" or "line" welding, to overlap the edges of the sheet or sheets to be joined, as shown in Fig. 1, at 1, and to feed the electrode roller 2 over the joint with a fixed electrode 5 therebeneath, the electrodes being connected to a source of electrical energy 4, of low potential, but of high current capacity, so as to cause a large current to flow through the wheel 2 and joint 1, to the electrode 5, while at the same time the wheel applies pressure to the joint 1, so that the two sheet edges *a* and *b* are electrically welded together at the joint 1. Instead of using the fixed electrode 5, a wheel electrode 3 may be substituted therefor, as shown in Fig. 2.

In practice, and particularly where it is desired to obtain a continuous and perfect weld, for vacuum tightness or other reasons, great difficulties are encountered. Slight irregularities in the surfaces of contact between the sheet will prevent their coming in contact, and allowing the flow of the current therethrough, at the point where the irregularity occurs, with the probable result that an arc will be produced thereacross, by a sudden interruption of the large current required to weld, which arc is extremely likely to burn or puncture a hole in the metal sheets. In case the irregularity is not sufficient to produce an arc, the current, nevertheless, may not flow through the point at which the irregularity occurs, but may flow around this point, so as to leave the parts unwelded at this point, causing an imperfect weld. In Fig. 2 various types of irregularities, producing imperfect welds, are illustrated. 6 represents a surface flaw. 7 a bend or kink in the sheet. 8 a scratch in the surface of the metal, and 9 a foreign particle between the sheets. It will, however, be seen that any other cause which prevents the sheets from coming in contact at each successive point along the line of the weld may cause a serious defect in the weld. The arrows around the irregularity 6 in Fig. 2 show the probable course of the current around such irregularity, whereby no current flows through the irregularity, and hence the parts are not welded at this point. Even in cases where the irregularity is so slight that contact is made, because the pressure applied is sufficient to distort the metal at the irregularity until the two surfaces come in contact, this contact is not good enough to permit the flow of sufficient current through the point of the imperfection to produce the welding temperature, or else the residual pressure available at the point after distortion of the metal to make the contact is not sufficient to complete the welding operation, and the weld is accordingly imperfect at that point. Also according to the methods just described, a joint is produced that is considerably greater in thickness than the thickness of the metal sheets at either side of the weld, and in many cases this is objectionable, as it is often desired to have the resulting product of practically uniform thickness, as in certain cylindrical parts for vacuum bottles, cartridge shells, shell cases, &c., where it is desired not only that the strength of the finished article be uniform, but that the surface be smooth and preferably of even thickness. The variation in thickness and unevenness of the resulting weld above described is illustrated in Fig. 3. While it is seen that the thickness of the finished weld is somewhat less than the sum of the thickness of the two original sheets, it being reduced somewhat by the pressure applied while the metal was hot, yet the reduction in thickness is insufficient to produce the desired result. Also in welds of this type, there is a pronounced tendency to leave a considerable part of the lapped joint unwelded, so that cracks or fissures are left, as shown at 10 and 11 in Fig. 3. In some cases this feature is very objectionable, as in the production of welded sheet metal articles adapted to be covered with enamel or other coating, because the fissures contain air, which remains in place when the article is coated, but which air expands with the changes in temperature, as when the article is heated when being enameled, causing bubbles and blisters where the air attempts to force, or forces its way through the enamel, and so prevents a smooth or perfect coating. The fissures 10 and 11 are also objectionable in cases where it is desired to electroplate the article, because the air in the fissures prevents the deposit of the plating coating at this point, and even if the air could be driven out, a narrow opening of the fissure would, to a considerable extent, prevent the deposit of the plating coating, and because of the difficulty of coating the surfaces within these fissures, there is no protection to the metal therein, and experience has shown that such welds, made by the old style processes and electroplated will soon begin to rust in the fissures 10 and 11, not only damaging the appearance of the device, but greatly shortening its life.

It has also been found that even if the sheets be of a non-rusting metal, the fissures will take in, by capillary attraction, a certain amount of plating solution, which will later evaporate, leaving salts deposited in the fissures, and these salts have a tendency to deliquesce, causing what is known as "leak-out", which will corrode the adjacent metal and thereby damage the article.

There is also the well-known method of "butt" welding, in which the ends or edges of two pieces of metal are pressed together longitudinally, while current flows across the contacting portion area to weld the two together. While this method is very satisfactory for welding bars, rails, and similar heavy pieces of metal, it is unsatisfactory where the pieces to be welded are comparatively thin, so that they have not sufficient rigidity to transmit the necessary pressure to get a satisfactory, or vacuum tight weld.

According to the present invention, these disadvantages can be largely, if not wholly overcome. In carrying out the invention in its preferred embodiment, in the joining of relatively thin flexible sheet metal edges, we so form the edges that each is beveled off, the bevel of one being parallel to the bevel of the other, as illustrated in Fig. 4. The edge portion of one is bent laterally so as to be laterally displaced with respect to the other, as shown at 13, the bevel face thereof, at 14, being brought into the position parallel with the main body of the sheet. These sheets or edge portion of sheets are then brought into juxtaposition to one another, as illustrated in Fig. 6, and suitably clamped relative to one another and to the fixed electrode or conductor 5, so that they cannot move bodily relative to one another.

One method of clamping the parts in position is illustrated in Fig. 4ª in which two hollowed out jaws 30 are provided with their inner faces of proper dimensions to close, fit and grip the article to be welded. Inside is an expanding mandrel forming one electrode 5, the mandrel being expanded by a wedge 31 operated by toggle links 32 in any suitable manner so that the article to be welded is tightly gripped at practically all points except directly beneath the electrode wheel 2. The roller electrode 2 is then passed over the parts to be joined, as illustrated in Figs. 5, 6, 7, 8 and 9. The peripheral face of the roller 2 is parallel to the bevel face 14, so that there is a relatively large surface engagement therewith, to provide a path of relatively small resistance to the current from the roller 2 to the edge of the sheet $a$. The current passes through the edge of the sheet $a$ and partly through the sheet $a$ to the electrode 5. Another portion of the current passes through the relatively long narrow edge or line of contact between the sheets $a$ and $b$ and through the sheet $b$ to the electrode 5. The parts through which the current passes becomes heated to the welding point at the surfaces of contact, are softened, and by means of the pressure applied by the wheel 2, are forced downwardly, while still heated, welding the metal parts together at their surfaces of contact and forcing them into the original space 12 above the stationary conductor 5. Owing to the relatively small area of contact of the different parts at the point A—A, as shown in Fig. 6, the parts become rapidly heated, but probably the highest temperature is reached in the neighborhood of points B—B, C—C, as shown in Figs. 7 and 8. After this, owing to the increasing width and area of the weld, and consequently, the affording of a path of less resistance, so that the current is more distributed, the parts become cooled below the welding point, but the roller 2 continues to forge the parts into the position shown in Fig. 9, to solidly confine them between the wheel 2 and stationary conductor 5, and parts being at a lower temperature, and offering greater resistance to forging, the pressure is at a maximum during this portion of the operation, so that the forging is completed at a temperature below the welding point, which is desirable in that it results in a weld that is dense, uniform and practically free from blow holes or other imperfections. While it is practically impossible to ascertain the exact temperatures of all the parts at various stages illustrated in Figs. 6 to 9, inclusive, yet from the color of the metal observed in the welding of such thin metal sheet edges, it is believed that the temperature of parts on the line A—A is about 1200° C.,—of parts on the line B—B and on the line C—C about 1500° C., and of the parts on the line D—D about 1000° C., or less. It will be seen that the welding first takes place along a narrow edge, and is gradually carried on over the surfaces to be welded until the whole end edge is welded at the last stages. By first welding this thin part or corner of the sheet $b$, then forging the other part down upon it while the latter is above the welding temperature, it will, during the forging operation, fill up the space left by any irregularities, and form a clean, perfect weld to the member $b$. This will happen more readily because the edge of the sheet $b$, being thin, is easily softened and offers little resistance to the downward forging action, even where it is already welded to the sheet $a$, there being little or no bridging effect to prevent adjacent portions of sheet parts $a$ and $b$ from coming into contact with each other, so that the edge of the sheet $b$ is bent downward during the forging operation, so as to continue to bring new portions of the sheet $b$ into contact with portions of the sheet $a$, which is also being simultaneously bent and forged downwardly until the forging operation is complete. Even if foreign particles occur on the surfaces to be united, an area of contact is established so great entirely around the foreign particle that a vacuum tight joint will still be produced.

It is evident that by varying the proportions of the space 12 and the amount of overlapping or volume of metal at 13, laterally displaced, welds of any desired thickness may be obtained. If the volume of the space 12 equals the volume of metal laterally displaced at 13, above the dotted line X the resulting joint will be exactly equal in thickness with that of the adjacent sheet portions, and if greater, the resulting joint will be somewhat thinner, and if less, the resulting joint will be somewhat thicker. Thus the thickness of the resulting joint is easily controlled, but for most purposes it is preferred to make the joint of the same thickness as the adjacent sheet portions or only slightly thicker.

It is found that sheet edges welded and forged in this manner are practically free of defects shown at 10 and 11 at Fig. 3, probably because the surfaces through which the current must pass are brought into intimate contact and because the forging of the metal thoroughly consolidates the entire final area of contact between the sheets.

While it is very desirable that the surfaces 14 be parallel to the peripheral surface of the electrode roller 2, in order that there shall be no sharp corners which might produce depressions in the roller or wheel 2, yet this is not essential, so far as the resultant weld is concerned. A satisfactory weld may be obtained even when the edge of the sheet presented to the roller 2 is not flat or parallel therewith. For instance, as illustrated in Fig. 10, the edge of the sheet $a$ is beveled in the opposite direction from that shown in Fig. 4, so that an edge or corner 15 is presented to the wheel 2, but in this case the contact surface of the wheel is more quickly roughened to a point where resurfacing thereof is advisable, in order to obtain the best results. The resulting weld, however, is substantially the same as that shown in Fig. 9.

Also as shown in Fig. 11, both of the edge portions of sheets $a$ and $b$ may be bent upwardly at 17 and 18, contacting along the line at 19. As the forging roller passes thereover, it forces the thinner portions 17 and 18 together, and downwardly, so that the contact area between them gradually increases and they are gradually forged into the space so as to produce a uniform weld of practically the same thickness as the adjacent sheet portions.

The arrangement illustrated in Fig. 12 is similar to that illustrated in Figs. 4 to 9, except that instead of making the edge portions thinner by means of flat bevels, the edges are beveled off more or less round, but the resulting weld is practically the same.

In Fig. 13 only one of the sheet edges is shown beveled or cut away, so as to be thinner at the edge portion. From this figure it will be seen, however, that the engagement of parts is initially along the single line or long narrow edge, and that the area of engagement will be gradually increased as the forging and welding continues, and also upon the forging being completed, the resulting joint will be of substantially the same thickness as the adjacent sheet parts.

In Fig. 14 a further modification is illustrated, embodying the invention in its broader aspects. The sheet *b* is provided with a longitudinal rounded ridge 20 with adjacent round bottom grooves so that when the edge portion of sheet *a* is overlapped onto sheet *b*, the two engage one another along a relatively long narrow edge. When pressure and current are applied by the wheel 2, the welding first takes place along the narrow edge and as the wheel is progressed, the width of the weld is gradually increased as the rib or ridge 20 is gradually flattened out. In this modification it is not attempted to have the joints of the sheets of the same thickness as the sheets.

In Figs. 15 and 16, the method in its broader aspects is illustrated as applied to the welding of edge portions to a cylindrical part. In Fig. 15, the cylinder 21 is to have the end cylindrical member 22 welded thereinto. To provide a long narrow ridge portion or edge along which the parts may engage the part 22 is provided with a circumferential ridge 23, and adjacent groove 24. With the part 22 acting as one electrode and then passing a roller electrode over the member 21 opposite the parts 23 and 24 and applying pressure thereto, the edge portion of the member 22 is welded to the member 21 along the narrow edge portion of ridge 23 at first, and the width of the weld is gradually increased as the pressure is continued or increased, until the parts assume the position shown at the bottom part of Fig. 15, where the area included in the dotted lines 25 shows the relative area of welding.

In Fig. 16 a similar arrangement is shown, except that a lateral projecting ridge 26, instead of a transverse projecting ridge, as shown in Fig. 15, is used.

Many other modifications may be made without departing from the spirit and scope of the invention in its broader aspects. The invention is not limited to the making of weldings which are flat or straight in contour, but may be applied to the making of welds which are circular, elliptical, rectangular, or follow any prescribed contour of the metal parts to be welded, and the welding may be carried out in air or other gases, or in liquids or other suitable medium.

What we claim as new and desire to secure by Letters Patent is:

1. The improved method of welding together metallic sheet edges which consists in overlapping the edges and forming them so that one engages the other along a relatively narrow and long surface area, passing an electric current through such surface area to weld the parts together and forging the parts together to increase the width of the welded area.

2. The improved method of welding a flexible metal edge portion to another metallic part, which consists in overlapping the edge portion on the other part to which it is to be welded, the parts being so formed that one engages the other along a relatively narrow edge, passing an electric current through the parts at said narrow edge portion and applying pressure to press the parts together along said narrow edge portion, to cause said parts to be welded together along said narrow edge portion.

3. The improved method of welding a flexible metal edge portion to another metallic part which consists in overlapping the edge portion on the other part to which it is to be welded, the parts being so formed that one engages the other along a relatively narrow edge, passing an electric current through the parts at said narrow edge portion and applying pressure progressively along said narrow edge portion, to press the parts together along said narrow edge portion to cause said parts to be welded together along said narrow edge portion at first and the width of the weld to be gradually increased.

4. The improved method of welding a flexible metal edge portion to another metallic part, which consists in overlapping the edge portion of the sheet on the part to which it is to be welded, the parts being so formed that one engages the other along a long narrow edge with an adjacent cut away portion, passing an electric current therethrough and applying pressure to weld the parts together.

5. The improved method of welding together metallic sheet edges, which consists in forming one sheet edge so as to make it thinner at the edge portion, bending the other sheet edge so that it is laterally displaced from the position it occupies in the finished structure, and has a surface engagement with the other sheet edge materially less than the edge surface of the edges, passing an electric current through the edges and forging them together to electrically weld them together.

6. The improved method of welding together metallic sheet edges which consists in forming one sheet edge so as to make it thinner at the edge portion, bending one sheet edge so that it is laterally displaced from the position it occupies in the finished structure, passing an electrode over the edges to cause an electric current to pass through the sheet edges and forging them together to electrically weld them together.

7. The improved method of welding together metallic sheet edges which consists in forming one sheet edge so as to make it thinner at the edge portion overlapping the edges to be welded, passing an electrode over the edges to cause an electric current to pass therethrough and forging them together to electrically weld them together.

8. The improved method of welding which consists in bringing the parts to be welded into juxtaposition with one part thinner at the portion to be welded, and one part bent adjacent the portion to be welded so as to be laterally displaced from the position it occupies in the final product and then passing an electrode over the portions to be welded to cause an electric current to pass therethrough and forging them together to electrically weld them together.

9. The improved method of welding which consists in holding the parts to be welded rigidly in juxtaposition to one another with one part thinner at the portion to be welded, and one part bent so as to be laterally displaced from the position it occupies in the final product, and has a surface engagement with the other part materially less than the cross section of said parts, and then passing an electric current through the portions to be welded and forcing them together to electrically weld them together.

10. The improved method of welding which consists in holding the parts to be welded rigidly in juxtaposition to one another, with one part thinner at the portion to be welded, and the other part overlapping the other to such an extent that the resultant metal at the joint will be of substantially the same thickness as the body of the parts being welded, and then passing an electrode over the portions to be welded and forging them together to electrically weld them together.

11. The improved method of welding together metallic sheet edges which consists in forming one sheet edge so as to make it thinner at the edge portion, overlapping the other to such an extent that the resultant metal at the joint will be of substantially the same thickness as the sheets themselves and passing an electric current through the edges and forcing them together to electrically weld them together.

12. The improved method of welding together metallic sheet edges, which consists in forming one sheet edge so as to make it thinner at the edge portion, bending the other sheet edge so that it is laterally displaced from the position it occupies in the finished structure, to such an extent that the resultant metal at the joint will be of substantially the same thickness as the sheet parts, and with the edges having a surface engagement materially less than the edge surface of the edges, passing an electric current through the edges and forging them together to electrically weld them together.

13. The improved method of welding together metallic sheet edges, which consists in forming one sheet edge so as to make it thinner at the edge portion, bending the other sheet edge so that it is laterally displaced from the position it occupies in the finished structure, to such an extent that the resultant metal at the joint will be of substantially the same thickness as the sheet parts, passing an electric current through the edges and forging them together to electrically weld them together.

14. The improved method of welding together metallic sheet edges which consists in bringing the edges into juxtaposition with one another with one edge bent to one side so that it engages only a portion of the edge surface of the other edge, and then passing an electrode over the edges to cause an electric current to pass through the engaging surfaces and forging the bent portion to increase the area of the surfaces engaging one another to electrically weld the same together.

15. The improved method of electrically welding together two metallic parts which consists in bringing the parts into juxtaposition to one another with a relatively small surface contact area between them, passing a welding current therethrough and forging the parts to increase said surface contact area and weld the parts together and continuing the forging after the temperature of the parts has decreased below the welding temperature.

16. The improved method of welding metallic sheet edges which consists in bringing the edges into juxtaposition with one another with a relatively small surface contact area between the edge portions, passing an electrode over the edge portions to cause a welding current to pass through said surface contact area and forging the parts to increase said surface contact area and weld the sheet edges together and forging the weld after the temperature of the weld has decreased below the welding temperature.

17. The improved method of electrically welding together the edges of flexible metal sheets of equal thickness, which consists in displacing one sheet along its edge out of the plane of the sheet so that the two sheets meet along a line only and leave a space between the two sheets being welded, welding the two edges and forging them, while heated, to cause the softened parts of the metal to fill such space and the two metal sheets to be united into a continuous integral sheet of the same thickness and the same tensile strength at the joint as at adjoining places of the sheet.

18. The improved method of welding together sheet metal edges which consists in bringing the edges into juxtaposition with one edge portion lying against a corner of the other edge portion at an angle thereto, passing the welding current through the edge portions to enlarge the areas of each in contact with one another and weld the same together.

19. The improved method of welding together metal parts which consists in bringing the two parts into juxtaposition with the edge portion of one beveled on one side and the edge portion of the other displaced laterally from the position it occupies in the finished structure, so that it engages the edge of said bevel, and passing a welding current through the parts and forging them into place to electrically weld them together.

20. The improved method of welding together metal parts which consists in bringing them into juxtaposition with the edge portion of one bent laterally and its edge beveled so that it presents a flat surface to a forging electrode, and applying a forging electrode thereto to cause a welding current to pass through the parts and forge the bent out portion into normal position and electrically weld the parts together.

21. The improved method of electrically welding together metallic sheet portions which consists in bringing into juxtaposition two metallic sheet edge portions, one being reduced in thickness where it is to be welded and the other bent laterally and having a beveled edge so that it presents a flat surface to a forging electrode, and applying a forging electrode thereto to cause a welding current to pass through the parts and forge the bent out portion into normal position and electrically weld the parts together.

22. The improved method of electrically welding together metallic sheet portions, which consists in bringing into juxtaposition two metallic sheet edge portions, one being cut away on one side and the other being cut away on the other side, and one being laterally displaced so that the face, as distinguished from the edge, of one sheet portion engages the reduced end of the other, and passing a welding current through the parts and forging them into normal position to electrically weld them together.

23. The improved method of electrically welding together metallic sheet portions which consists in bringing into juxtaposition two metallic sheet edge portions, one being cut away on one side and the other being beveled off on the other side to form a flat beveled face, and laterally displaced, so that the face, as distinguished from the edge of one sheet portion engages the reduced end of the other, the flat beveled face lying substantially parallel to the general plane of the sheet portions, and applying a forging electrode to said beveled face to cause a welding current to pass through the parts and forge them into normal position to electrically weld the edge portions together.

24. The method of uniting two metallic parts which comprises supporting the parts to be united along lines spaced apart from their edges, one edge being thin and flexible relative to the main body of the part and spaced above the support, the other edge overlying the first mentioned edge and being thinner and more flexible than the main body of the part, gradually rolling down the overlying edge against the other edge and passing a current through said overlying edge to its support and through said overlying edge to the other edge to its support and gradually welding said edges together and forging them into substantially a common plane against said support.

25. The method of uniting two metallic parts which consists in overlapping flexible wedge-shaped portions of the edges, gradually rolling the overlying edge against the other edge and simultaneously passing a current through said edges, gradually heating and simultaneously bending and welding the overlying edge and underneath edge along an increased area of contact as the edges are brought into substantially a common plane.

26. The method of uniting two metallic parts which comprises, first forming the edges into relatively thin tapering wedges, supporting the parts with the edges adjacent each other and spaced above the support, passing a current through the contacting edges and simultaneously applying pressure to soften and bend the extreme edges and simultaneously welding the same together along increasing areas of contact and forging the two edges of the metal into substantially a common plane.

27. The method of uniting two metallic parts which comprises, shaping the edges into tapering wedges, supporting one part in a substantially flat plane, supporting a portion of the other edge with its extreme margin overlying the margin of the first edge, passing a current through the two edges and gradually welding them together along increasing areas of contact and simultaneously forcing the margins into the plane of the main portions of the parts.

28. The method of uniting two metallic parts which comprises forming one of the parts with a tapered edge and providing a recess adjacent said tapered edge, overlapping a relatively flexible sheet metal part on said tapered edge, and simultaneously passing current through said parts and applying pressure to gradually soften and weld said parts together along an increasing area of contact and forcing metal into said recess.

29. The improved process of welding a sheet of metal to another metal part which consists in displacing a portion of the metal surface of the latter part so as to leave a space adjacent to the displaced portion and so that at and around the point of displacement the sheet and the other metal part will be in contact only along the line of the part displaced, electrically welding the sheet and the displaced metal of the other part along the line of displacement and forging the two together at such part, while heated, to cause the displaced metal to soften and fill the adjacent space, and the sheet metal and the surface of the other part to be united at such place to form a continuous smooth joint.

30. The improved method of electrically welding together two pieces of metal which consists in displacing a portion of the surface of one piece so as to leave a space between said pieces adjacent to said line of displacement, bringing the metal pieces together so that along and adjacent to the line of displacement the two will make contact only along said line of displacement, welding along said line, and forging the parts thus treated by pressure acting in a plane substantially at right angles to the surface of the two metallic pieces to increase the welded areas and fill said space with softened metal, whereby the two parts will be welded together along said line of displacement by a continuous smooth weld.

31. The improved process of welding together two metallic pieces which consists in forming a ridge in the surface of one of the pieces so that a space in said surface is left adjacent to said contact line, bringing the two pieces together so that along and adjacent to the line of said ridge the contact will be only along the line of said ridge, passing a welding current between said pieces along said contact line and gradually along an increased area as the parts soften, forcing the parts together while thus heated until said space is filled with metal, whereby a smooth and continuous joint is made between said pieces.

32. The improved process of welding together two metallic parts which consists in raising a ridge or projecting portion from the surface of one of the parts and leaving a depression in said surface adjacent thereto and parallel therewith, bringing the two parts together so that the contacting portion of the one will consist of said ridge formed therefrom and the opposed contacting portion of the other will be a surface of larger area than said ridge, passing a welding current through the said pieces along the line of the ridge or projecting portion, and forcing the heated metal into said depression to fill it, whereby a continuous welded joint will be formed between the surfaces of the two parts along the line of the formerly existing ridge or projection.

33. The improved process of welding the edges of two pieces of sheet metal which consists in bringing the edge of one of the said pieces into contact with a larger surface of the other piece adjacent to its edge, leaving a space between the two pieces adjacent to the said edge, passing a welding current through the parts and applying pressure to bring the portions of said pieces along the line of said edge to a welding heat, continuing the current and pressure to increase gradually the area of welding heat, forging the parts together to fill said adjacent space with metal, whereby a joint of substantially the same thickness and tensile strength as the adjoining parts of said sheets is made between the edges of said sheets.

34. The improved process of electrically welding the edges of two sheets of metal which consists in bringing a portion of the edge of one of the sheets into contact with a larger surface of the other sheet adjacent to its edge so as to leave a space between the two sheets adjacent to the edges, applying electric current and pressure to bring the portions of said sheets along the line of the edge to a welding heat, continuing the current and pressure to increase gradually the area of welding heat until through the increase of such area of contact the heat is decreased below the welding point, and continuing the pressure, while at a temperature lower than the welding heating, to fill such adjacent space with softened metal, and to form a joint of substantially the same thickness and tensile strength as at adjoining parts of the said sheets of metal.

35. The process of electrically welding together the edges of two pieces of sheet metal which consists in bringing the said pieces of metal together so that a portion of the edge of one piece will bear against a larger surface of the other piece so that the area of welding contact at first will be along substantially a line, passing the current through said parts and appying pressure to force the edges gradually together and gradually increase the area of welding contact until the edges have been welded together to form a smooth and continuous joint of the same thickness and tensile strength as the sheets at adjacent points.

36. The process of electrically welding together the edges of two pieces of sheet metal which consists in bringing the said pieces of metal together so that a portion of the edge of one piece will bear against a larger surface of the other piece so that the area of welding contact at first will be along substantially a line, passing the current through said parts and applying pressure, at substantially a right angle to the plane of the sheets being welded, to force the edges gradually together and gradually increase the area of welding contact until the edges have been welded together to form a smooth and continuous joint of the same thickness and tensile strength as the sheets at adjacent points.

In testimony whereof, we have signed our names to this specification.

HERBERT M. SMITH.
WILLIAM W. STANLEY.

---

Correction in Letters Patent No. 1,249,532.

It is hereby certified that in Letters Patent No. 1,249,532, granted December 11, 1917, upon the application of Herbert M. Smith and William W. Stanley, of Great Barrington, Massachusetts, for an improvement in "Electric Welding," an error appears in the printed specification requiring correction as follows: Page 4, line 47, after the period insert the sentence *This action has been found to harden the metal in this welding area.*; and that the said Letters Patent should be read with this correction therein that the same may conform to the record of the case in the Patent Office.

Signed and sealed this 5th day of February, A. D., 1918.

[SEAL.]

R. F. WHITEHEAD,
*Acting Commissioner of Patents.*

Cl. 219—10.